UNITED STATES PATENT OFFICE.

MONE R. ISAACS, OF PHILADELPHIA, PENNSYLVANIA.

ADHESIVE COMPOUND OR SIZING.

959,348.   Specification of Letters Patent.   Patented May 24, 1910.

No Drawing.   Application filed January 9, 1908. Serial No. 409,969.

*To all whom it may concern:*

Be it known that I, MONE R. ISAACS, a citizen of the United States, residing in Philadelphia, Pennsylvania, have invented an Improved Adhesive Compound or Sizing, of which the following is a specification.

My invention relates to the production of a casein solution or casein glue suitable for use in sizing paper and textile fabrics, for gluing woodwork, for paint manufacture and other suitable purposes. For such purposes casein solutions have already been applied but in these prior instances casein of a character different from that used by me has been employed. Commercial casein, as at present used, is chiefly precipitated from skim milk by means of an acid, either by an acid added to the milk for that purpose or by the lactic acid developed in the milk itself by fermentation.

The casein used in my process is that prepared by precipitating milk with rennet or similar unorganized ferments and such casein has hitherto been used almost exclusively as a food stuff or in the preparation of a casein cement, this being due to the fact that hitherto there have been no known and commercially available methods of obtaining a suitable solution from rennet casein. While ordinary casein will dissolve in water if 11 to 15 parts of sodium biborate is added to every 100 parts of casein, rennet casein, when so treated, does not dissolve, but upon the application of heat becomes a soft, viscous mass which may be used as a cement but which cannot be made into a flowing solution, and which cannot therefore be used as a sizing.

In carrying out my invention I add to rennet casein, besides the ordinary alkali or alkaline salt used in making ordinary casein solutions, a soluble fluorid and, if a solution is desired, water is also added, with or without the application of heat. The combined action of the fluorid and the alkali or alkaline salt renders the rennet casein soluble and a well flowing solution is obtained which possesses great adhesiveness and is well adapted for use as a sizing glue or adhesive.

I prefer to use sodium fluorid but do not desire to restrict myself to this as any soluble fluorid or compound of hydrofluoric acid may be used or hydrofluoric acid itself may be taken, though the latter would of course be converted into a fluorid by reacting with the alkaline ingredient.

A composition containing 100 parts of rennet casein, 15 parts of sodium biborate and 15 parts of sodium fluorid will, upon the addition of 400 parts of water, give a solution of a suitable character. These proportions are merely given as an example and I do not desire to restrict myself to them or to any specific formula as various changes may be made in the proportions depending on the quality of the casein and the purpose for which the solution is intended. Instead of sodium biborate any one or more of the alkalies or alkaline compounds ordinarily used in making casein solutions may be taken. This I may use in conjunction with a fluorid, calcium hydroxid, sodium hydroxid, sodium carbonate, sodium phosphate, sodium tungstate, etc. Instead of casein precipitated with rennet, there may be used casein precipitated with any similar unorganized ferment giving a casein of like character; and by "rennet casein," as used throughout my specification and claims, I mean a casein obtained by precipitating casein from milk by any such unorganized ferment (the milk being preferably first skimmed) and then separating the casein from the whey and either drying the casein or using it in the wet state.

In the United States Letters Patent No. 838,785, granted me on December 18, 1906, I described a method of improving the character of casein solutions by the use of a fluorid as an ingredient, but neither there nor elsewhere, as far as I am aware, has the action of fluorid in making rennet casein soluble been described.

I claim:

1. A glue or adhesive compound composed of rennet casein, a hydrofluoric acid compound, alkaline matter and water.

2. A glue or adhesive compound composed of rennet casein, sodium fluorid, alkaline matter and water.

3. A composition of matter, consisting of rennet casein, a hydrofluoric acid compound, and alkaline matter.

4. A composition of matter, consisting of rennet casein, sodium fluorid, and alkaline matter.

5. The mode herein described of rendering rennet casein soluble, said mode consisting in adding thereto a hydrofluoric acid compound and alkaline matter.

In testimony whereof, I have signed my name to this specification, in the presence of two subscribing witnesses.

MONE R. ISAACS.

Witnesses:
HAMILTON D. TURNER,
KATE A. BEADLE.